(12) United States Patent
Matsumoto et al.

(10) Patent No.: US 9,687,410 B2
(45) Date of Patent: Jun. 27, 2017

(54) WALKING ASSISTANCE DEVICE

(71) Applicant: Sharp Kabushiki Kaisha, Osaka-shi, Osaka (JP)

(72) Inventors: Takehide Matsumoto, Osaka (JP); Hideaki Fujita, Osaka (JP); Akikazu Ueyama, Osaka (JP); Yuuki Matsuoka, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/895,279

(22) PCT Filed: Jul. 23, 2014

(86) PCT No.: PCT/JP2014/069410
§ 371 (c)(1),
(2) Date: Dec. 2, 2015

(87) PCT Pub. No.: WO2015/049910
PCT Pub. Date: Apr. 9, 2015

(65) Prior Publication Data
US 2016/0106618 A1    Apr. 21, 2016

(30) Foreign Application Priority Data

Oct. 3, 2013  (JP) .................................. 2013-208139
Oct. 3, 2013  (JP) .................................. 2013-208140

(51) Int. Cl.
*A61H 3/04*      (2006.01)
*B60W 30/16*     (2012.01)

(52) U.S. Cl.
CPC ............... *A61H 3/04* (2013.01); *B60W 30/16* (2013.01); *A61H 2003/043* (2013.01);
(Continued)

(58) Field of Classification Search
CPC ............... A61H 3/04; A61H 2003/043; A61H 2003/046; A61H 2201/0173;
(Continued)

(56) References Cited

U.S. PATENT DOCUMENTS 7,708,120 B2 *  5/2010  Einbinder ................ A61H 3/04
                                                          188/19
8,500,143 B2 *  8/2013  Yu ........................... A61H 3/04
                                                          180/19.3
2011/0118898 A1 * 5/2011 Fu ........................... A61H 3/04
                                                          701/1

FOREIGN PATENT DOCUMENTS

EP    0 976 378 A1    2/2000
JP    2001-170119 A   6/2001
(Continued)

OTHER PUBLICATIONS

Official Communication issued in International Patent Application No. PCT/JP2014/069410, mailed on Aug. 26, 2014.

*Primary Examiner* — Todd Melton
(74) *Attorney, Agent, or Firm* — Keating & Bennett, LLP

(57) ABSTRACT

A walking assistance device includes: a base body; a driving unit that moves the base body; a distance detection unit that detects a distance from the base body to a user; a safety distance range setting unit that set, as a safety distance range, a distance range from the base body to the user during safe walk of the user; a walking state determination unit that determines whether or not the distance detected by the distance detection unit is out of the safety distance range; and a control unit that controls the driving unit when the walking state determination unit determines that the distance is out of the safety distance range. The walking assistance device detects that the distance is narrower than a predetermined distance, wherein the driving unit is controlled when
(Continued)

the approach determination unit detects that the distance is narrower than the predetermined distance.

15 Claims, 15 Drawing Sheets

(52) U.S. Cl.
CPC ............... *A61H 2003/046* (2013.01); *A61H 2201/0173* (2013.01); *A61H 2201/5033* (2013.01); *A61H 2201/5061* (2013.01); *A61H 2201/5064* (2013.01); *A61H 2201/5079* (2013.01); *B60W 2750/308* (2013.01)

(58) Field of Classification Search
CPC .... A61H 2201/5033; A61H 2201/5061; A61H 2201/5064; A61H 2201/5079
See application file for complete search history.

(56) References Cited

FOREIGN PATENT DOCUMENTS

| | | |
|---|---|---|
| JP | 2007-090019 A | 4/2007 |
| JP | 2007-202924 A | 8/2007 |
| JP | 2010-213915 A | 9/2010 |
| WO | 98/41182 A1 | 9/1998 |

\* cited by examiner

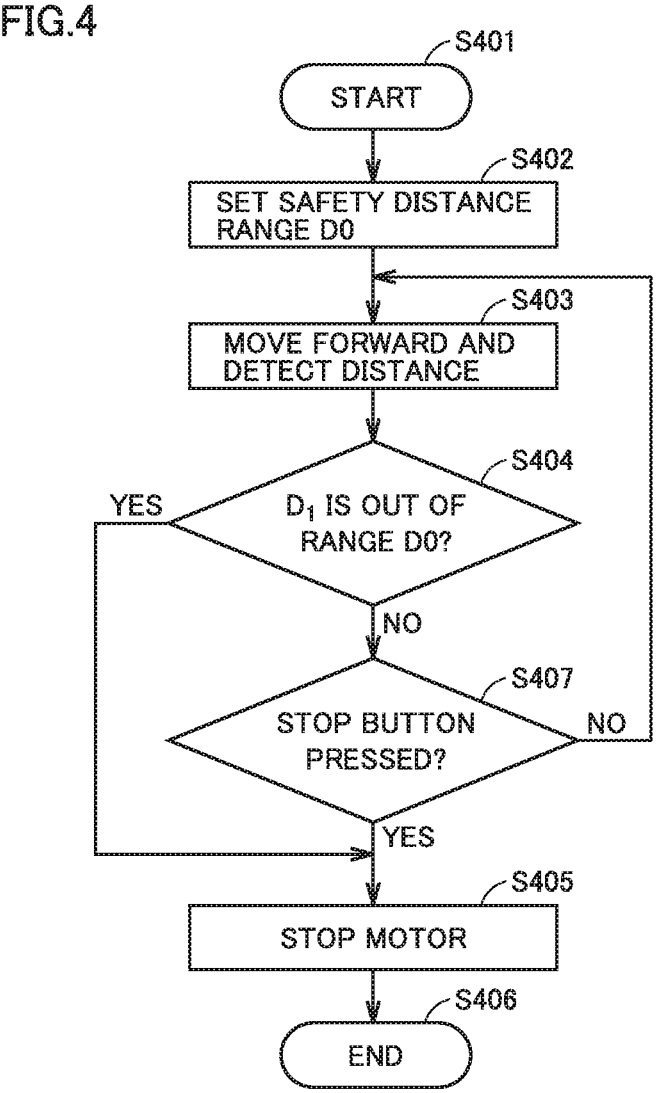

FIG.7

| INCLINATION ANGLE : α | MINIMUM VALUE : a (cm) | MAXIMUM VALUE : b (cm) |
|---|---|---|
| 5° | 40 | 80 |
| 10° | 45 | 75 |
| 15° | 50 | 70 |
| 20° | 55 | 65 |

FIG.8

| INCLINATION ANGLE : α | MINIMUM VALUE : a (cm) | MAXIMUM VALUE : b (cm) |
|---|---|---|
| 5° | m*1.1 | n*0.9 |
| 10° | m*1.2 | n*0.8 |
| 15° | m*1.3 | n*0.7 |
| 20° | m*1.4 | n*0.6 |

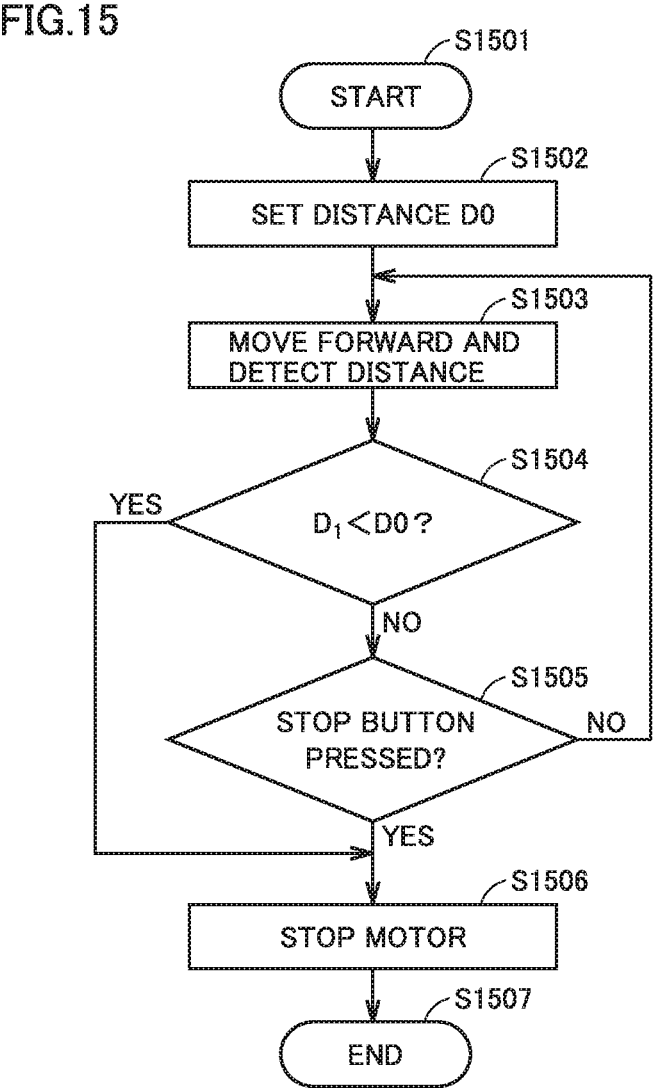

WALKING ASSISTANCE DEVICE

TECHNICAL FIELD

The present disclosure relates to a walking assistance device used for training of walking, walking, and the like of an elderly person, physically challenged person, or small child having a difficulty in walking, for example.

BACKGROUND ART

For example, when an elderly person goes shopping and takes a walk, a walking assistance device such as a walking aid or a walker for an aged person has been known as an assistant tool for walking safely. Such a walking assistance device has front and rear legs provided with wheels, and includes a handle at the upper end portion of the main body frame. The user grabs the handle and travels the wheels with the physical body being supported, thereby attaining safe walking. Further, a walking assistance device has been developed which provides driving force to wheels by a motor or the like so as to apply brake on a downhill or the like or help going up on an uphill.

FIG. 22 is a side view showing a structure of a walking assistance device 800 described in Patent Document 1. Walking assistance device 800 supports the user by a supporting portion 801, and has a control device to control a motor 805 in accordance with respective outputs of a force sensor 802, a distance sensor 803, and a speed sensor as well as a parameter set by a setting device 804 so as to drive driving wheels 806, thereby controlling forward movement, backward movement, and turning movement of base body 807.

Specifically, walking assistance device 800 detects a distance between walking assistance device 800 and the user, and when the distance becomes larger than a predetermined distance, walking assistance device 800 controls the driving of walking assistance device 800, thereby securing a constant distance between the walking assistance device and the user to prevent the walker from leaning forward.

Accordingly, when the user is delayed in taking a step forward, the walking assistance device moves forward to provide a wide interval between the walking assistance device and the user so as to prevent the user from having a posture greatly leaning forward and to assist the user in readily returning to the previous posture.

CITATION LIST

Patent Document

PTD 1: Japanese Patent Laying-Open No. 2001-170119

SUMMARY OF INVENTION

Technical Problem

However, the technique of the Patent Document is only to indiscriminately control the forward movement of the walking assistance device based on a distance between the user and the walking assistance device, and a distance between the user and the walking assistance device differs depending on the state of use of the user and walking environment during actual walking. Hence, it is necessary to control the walking assistance device appropriately to address this. Furthermore, the technique of the Patent Document is effective when the user is delayed in taking a step forward and the walking assistance device is moved ahead to provide a wide interval between the walking assistance device and the user; however, in an actual circumstance for use, the interval between the walking assistance device and the user may not only become wide but also may become narrow.

For example, when the user walks while pushing the walking assistance device and the user suddenly accidentally drops the wheels of the walking assistance device into a ditch such as a side ditch or a deep place or is hindered from being moving forward due to an obstacle ahead of the walking assistance device, the walking assistance device stops there; however, the walker cannot stop the walk suddenly and take a step forward, which may result in a narrow interval between the stopped walking assistance device and the user.

In another instance, when the user goes up on an uphill while pushing the walking assistance device and the user's pushing force becomes weak on the uphill, the walking assistance device moves backward on the hill due to gravity, which may result in a narrow interval between the walking assistance device and the user.

In a still another instance, when the user walks on a paved road while pushing the walking assistance device and the road circumstance is changed from a paved road to a gravel road or a field path abruptly, frictional force between the wheels and the road is changed to result in slow rotation of the wheels. However, the walker cannot slow down the walking speed abruptly, which may result in a narrow interval between the stopped walking assistance device and the user.

In the case where the interval between the user and the walking assistance device becomes narrow as described above, the user loses balance, the user's weight is applied to a knee, and the user may collapse from the knee (knee bending). Moreover, when the walking assistance device moves backward, the user may fall back.

Therefore, a technique is required to realize a walking assistance device excellent in safety by appropriately controlling a safety distance between the user and the walking assistance device in accordance with the user's walking state and walking environment, so as to prevent the user from bending knees and falling as a result of losing balance.

Moreover, when the distance between the user and the walking assistance device becomes narrow, a technique is required to prevent the user from bending knees and falling as a result of losing balance.

Solution to Problem

A walking assistance device according to one embodiment includes: a base body; a driving unit configured to move the base body; a distance detection unit configured to detect a distance from the base body to a user; and a control unit configured to control the driving unit based on a result of determination that at least the user is too close to the walking assistance device, the determination being made by comparing the distance detected by the distance detection unit with a predetermined value for determination.

Moreover, the walking assistance device may further include: a safety distance range setting unit configured to set, as a safety distance range, a distance range from the base body to the user during safe walk of the user; and a walking state determination unit configured to determine whether or not the distance detected by the distance detection unit is out of the safety distance range, wherein controlling the driving unit by the control unit based on the result of determination that at least the user is too close to the walking assistance device may include controlling the driving unit by the walking state determination unit when a distance detected by the distance detection unit is determined to be out of the safety distance range.

Moreover, the safety distance range setting unit may be configured to set the safety distance range based on the distance from the base body to the user when the user safely walks for a predetermined period of time.

Moreover, the safety distance range setting unit may be configured to set the safety distance range to be narrow when the distance detected by the distance detection unit is changed abruptly.

Moreover, the walking assistance device may further include an inclination detection unit configured to detect inclination of a road surface on which the walking assistance device travels, wherein the safety distance range setting unit may be configured to set the safety distance range based on the inclination detected by the inclination detection unit.

Moreover, the walking assistance device may further include a speed detection unit configured to detect speed of the walking assistance device, wherein the safety distance range setting unit may be configured to set the safety distance range based on the speed detected by the speed detection unit.

Moreover, the walking assistance device may further include a pressure detection unit configured to detect pressure with which the user grasps the grip, wherein the safety distance range setting unit may be configured to set the safety distance range based on the pressure detected by the pressure detection unit.

Moreover, the walking assistance device may further include a traveling direction detection unit configured to detect a traveling direction of the walking assistance device, wherein the control unit may be configured to control the driving unit based on the traveling direction detected by the traveling direction detection unit.

Moreover, the walking assistance device may further include an approach determination unit configured to detect that the distance detected by the distance detection unit is narrower than a predetermined distance, wherein controlling the driving unit by the control unit based on the result of determination that at least the user is too close to the walking assistance device may include controlling the driving unit by the approach determination unit when the approach determination unit detects that the distance detected by the distance detection unit is narrower than the predetermined distance.

Moreover, the walking assistance device may further include a traveling direction detection unit configured to detect a traveling direction of the walking assistance device, wherein the control unit may be configured to control the driving unit to stop the walking assistance device from moving forward or move the walking assistance device more forward when the traveling direction detection unit determines that the traveling direction is a forward direction.

Moreover, the control unit may be configured to control the driving unit to suppress the walking assistance device from moving backward, stop the walking assistance device, or move forward the walking assistance device, when the traveling direction detection unit determines that the traveling direction is a backward direction.

Moreover, the walking assistance device may further include a pressure detection unit configured to detect pressure with which the user grasps the grip, wherein the control unit may be configured to set the predetermined distance to be large when the pressure detected by the pressure detection unit is changed.

According to a certain aspect, a walking assistance device excellent in safety can be realized, whereby a safety distance between the user and the walking assistance device is appropriately controlled in accordance with the user's walking state and walking environment, thereby preventing the user from bending knees, and falling as a result of losing balance.

According to another aspect, a walking assistance device excellent in safety can be realized to prevent a user from bending knees and falling as a result of losing balance when the interval between the user and the walking assistance device becomes narrow.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 4 is a flowchart showing an example of operation of the walking assistance device according to the first embodiment.

FIG. 7 shows a table showing an example of setting of the safety distance range according to the second embodiment.

FIG. 8 shows a table showing an example of setting of the safety distance range according to the second embodiment.

FIG. 15 is a flowchart showing an example of operation of the walking assistance device according to the fourth embodiment.

DESCRIPTION OF EMBODIMENTS

Figure 1A:
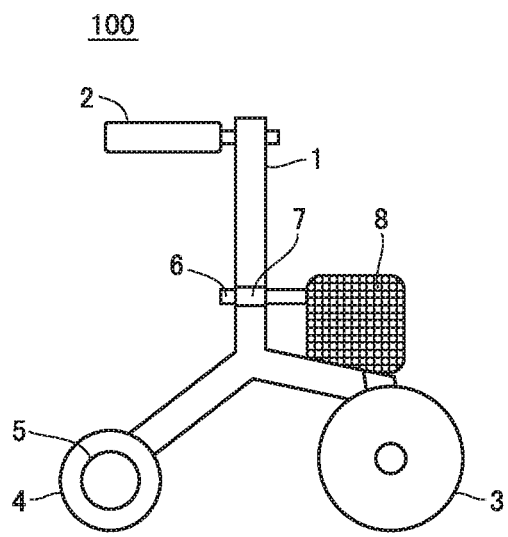
FIG. 1 shows side view and top view each illustrating a structure of a walking assistance device according to a first embodiment.

The following describes embodiments of the present invention with reference to figures. In the description below, the same reference characters are given to the same components. Their names and functions are also the same. Therefore, they are not described in detail repeatedly.

The following describes the embodiments of the present invention based on figures. It should be noted that each of the configurations described below is just a specific example of the present invention, and the present invention is not limited to this.

First Embodiment

Figure 1B:
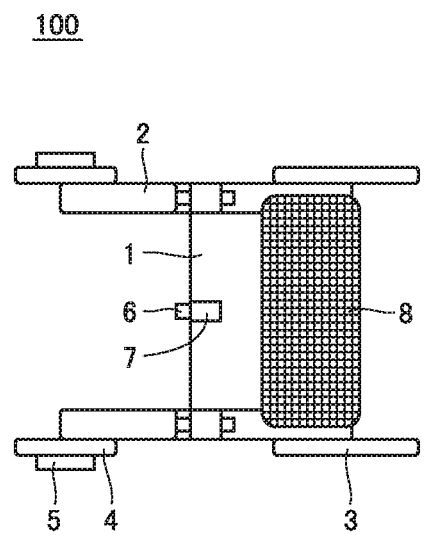

FIG. 1 shows side view and top view each illustrating a structure of a walking assistance device according to a first embodiment. FIG. 1 ($a$) is a side view showing the structure of walking assistance device 100 according to one embodiment of the present invention, whereas FIG. 1 ($b$) is a top view thereof. Walking assistance device 100 includes: a base body 1; a pair of left/right front wheels 3 and a pair of left/right rear wheels 4 movably supporting on the traveling surface on which base body 1 travels; a grip 2 provided on base body 1 and supported by the user; and a motor 5 serving as a driving unit that drives each of rear wheels 4. In this configuration, motor 5 is provided at rear wheel 4 and may drive rear wheel 4 to control the operation of walking assistance device 100; however, motor 5 may drive front wheel 3 to control the operation of walking assistance device 100, or may be provided at each of front wheel 3 and rear wheel 4. Furthermore, near the center of base body 1, a storage portion 8 is provided to store a luggage or the like.

Moreover, walking assistance device 100 includes a distance sensor 6 that detects a distance from walking assistance device 100 to the user, and a control unit 7 controls motor 5 based on the distance measured by distance sensor 6. As distance sensor 6, a non-contact sensor such as an ultrasonic sensor or an infrared sensor can be used. Alternatively, instead of the distance sensor, a proximity sensor may be used.

In the present embodiment, one distance sensor 6 is provided at a lower portion between left/right grips 2; however, in order to further increase the detection precision, a plurality of distance sensors may be provided. For example, distance sensors are provided in the vicinity of left/right grips 2. Moreover, in order to facilitate detecting the user's legs, distance sensor 6 is desirably disposed at a lower side of base body 1.

Figure 2:
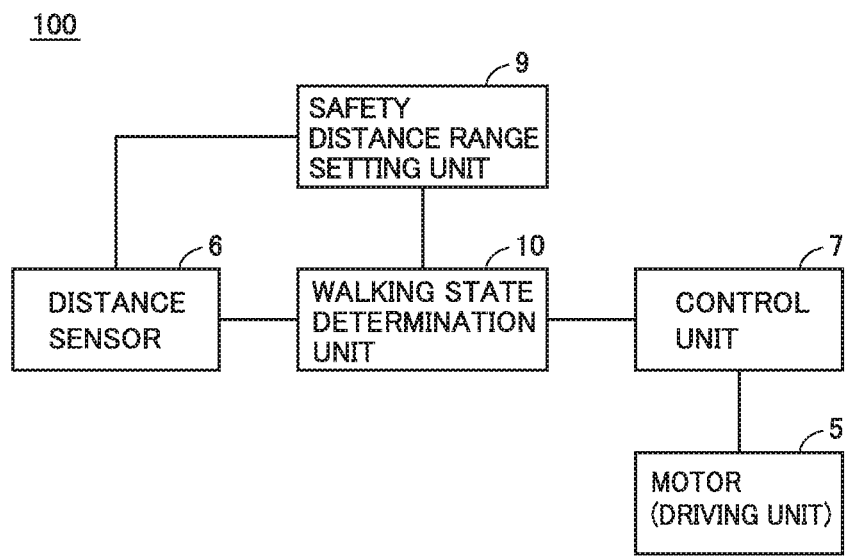
FIG. 2 is a block diagram showing the operation configuration of the walking assistance device according to the first embodiment.

FIG. 2 is a block diagram showing the operation configuration of walking assistance device 100. Safety distance range setting unit 9 and walking state determination unit 10 are provided in the vicinity of or inside of distance sensor 6 or control unit 7.

Safety distance range setting unit 9 sets, as a safety distance range, a distance range from walking assistance device 100 to the user when the user safely walks using walking assistance device 100. One example of the setting of the safety distance range is as follows: a time measurement unit or the like is provided at walking assistance device 100, a distance from walking assistance device 100 to the user is detected by distance sensor 6 when the user safely walks for a predetermined period of time, minimum value a and maximum value b are determined based on the detected value, and then the safety distance range is set. According to this method, the safety distance range can be set depending on a user even when a different user uses walking assistance device 100. Here, the safety distance range is assumed to be D0 (minimum value a, maximum value b). Moreover, safety distance range setting unit 9 changes the safety distance range in response to a result of determination by a below-described walking state determination unit 10.

Walking state determination unit 10 determines whether or not detection distance $D_1$ is out of the safety distance range, by comparing a detection distance $D_1$ and safety distance range D0 (minimum value a, maximum value b) set above. Detection distance $D_1$ is a distance from walking assistance device 100 to the user as detected by distance sensor 6 while the user is actually walking using walking assistance device 100.

Control unit 7 determines the rotation speed or torque of motor 5 connected to rear wheel 4 in accordance with a built-in program, and controls the rotation speed or torque of left/right motors 5 in accordance with the determined value. Moreover, the manner of control may be changed between a case where detection distance $D_1$ is larger than safety distance range D0 (minimum value a, maximum value b) and a case where detection distance $D_1$ is smaller than safety distance range D0 (minimum value a, maximum value b).

Figure 3A:
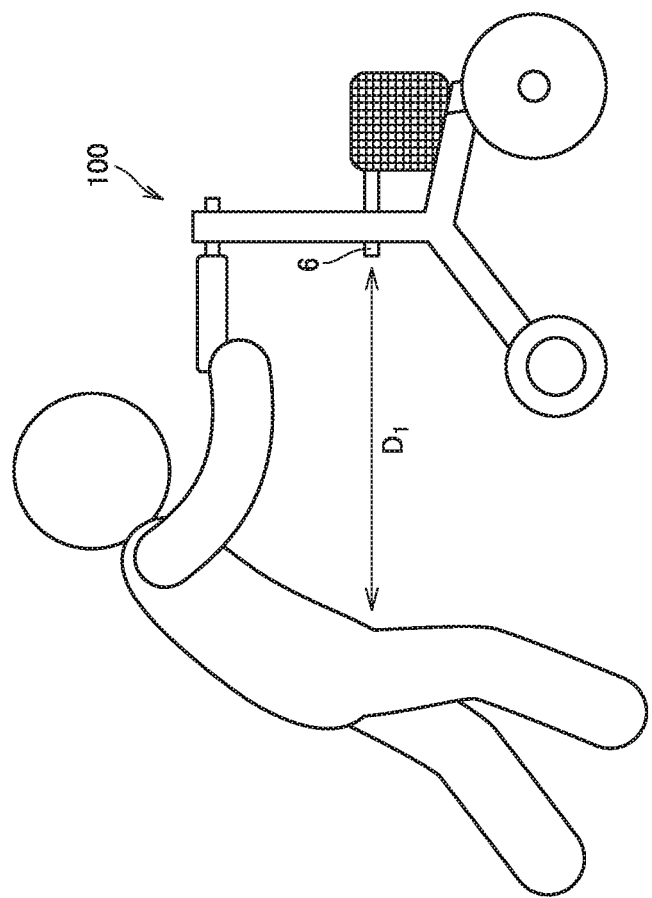
FIG. 3 shows a positional relation between the walking assistance device and the user.
Figure 3B:
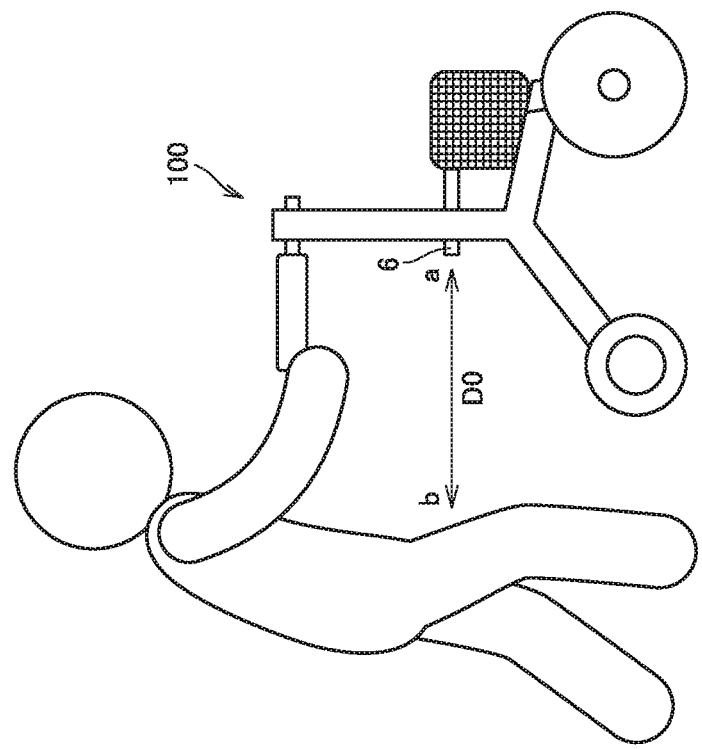

FIG. 3 shows an example of a positional relation between walking assistance device 100 and the user. FIG. 3 ($a$) shows a state of normal walk, whereas FIG. 3 ($b$) shows an example when the user has a leaning posture to result in a wider distance between the user and walking assistance device 100 than the safe walking distance range. Here, the distance between walking assistance device 100 and the user during the safe walk shown in FIG. 3 ($a$) is safety distance range D0 (minimum value a, maximum value b). When the distance falls out of this range, walking assistance device 100 determines that the user and walking assistance device 100 are too close to each other or are too distant away from each other. Here, the distance from walking assistance device 100 to the user as detected by distance sensor 6 when the user is walking is regarded as detection distance $D_1$.

Walking state determination unit 10 compares detection distance $D_1$ from walking assistance device 100 to the user as detected by distance sensor 6 with safety distance range D0 (minimum value a, maximum value b) received in advance, then determines that the user and walking assistance device 100 are too close to each other or are too distant away from each other when detection distance $D_1$ is out of the range of safety distance range D0 (minimum value a, maximum value b), and sends the determination signal to safety distance range setting unit 9 or control unit 7.

FIG. 4 is a flowchart showing an example of operation of walking assistance device 100 in the present embodiment.

This flowchart illustrates an exemplary case where the user and walking assistance device 100 are too close to each other or are too distant away from each other due to a certain reason after the user has safely walked.

First, a start button of walking assistance device 100 is turned on to bring walking assistance device 100 into an operation state (step S401). Next, safety distance range setting unit 9 sets safety distance range D0 (minimum value a, maximum value b) (step S402). A method of determining safety distance range D0 set after starting walking assistance device 100 may be such that a time measurement unit or the like is provided at walking assistance device 100, a distance from walking assistance device 100 to the user is detected by distance sensor 6 when the user safely walks for a predetermined period of time after starting walking assistance device 100, minimum value a and maximum value b are determined based on the detected value, and then the safety distance range is set as described above. Alternatively, the method may be such that the same value is used once the value is set until it is changed next time.

Next, the user grabs grip 2 of walking assistance device 100 and moves forward by walking normally with rear wheel 4 being driven by rotation of motor 5, and detection distance $D_1$ is detected by distance sensor 6 (step S403).

Next, walking state determination unit 10 compares detection distance $D_1$ from walking assistance device 100 to the user as detected by distance sensor 6 with safety distance range D0 set as described above, and determines whether or not detection distance D1 is out of safety distance range D0 (minimum value a, maximum value b) (step S404). When detection distance $D_1$ is out of safety distance range D0 (minimum value a, maximum value b) (YES in step S404), walking state determination unit 10 determines that the user and walking assistance device 100 are too close to each other or are too distant away from each other, and sends the determination signal to control unit 7. In accordance with a built-in program, control unit 7 stops rotation of motor 5 connected to rear wheel 4 (step S405), and ends the operation of walking assistance device 100 (step S406).

On the other hand, in step S404, when detection distance $D_1$ is within safety distance range D0 (NO in step S404), it is determined that the user is not too close to walking assistance device 100 or too distant away from walking assistance device 100, and control unit 7 determines whether or not a stop button is pressed (step S407). When the stop button is pressed (YES in step S407), control unit 7 stops rotation of motor 5 connected to rear wheel 4 in accordance with the built-in program (step S405) and ends the operation of walking assistance device 100 (step S406). On the other hand, when the stop button is not pressed (NO in step S407), walking assistance device 100 is continuously moved forward and the detection by distance sensor 6 is continued (step S403).

By performing the operation as described above, a safety distance between the user and the walking assistance device is appropriately controlled in accordance with the user's walking state and walking environment, thereby preventing the user from bending knees and falling as a result of losing balance.

In the present embodiment, it has been illustrated that walking state determination unit 10 compares detection distance $D_1$ from walking assistance device 100 to the user as detected by distance sensor 6 with safety distance range D0 received in advance and determines that the user and walking assistance device 100 are too close to each other or is too distant away from the user when detection distance $D_1$ is out of safety distance range D0. As an example other than this, walking state determination unit 10 may be configured to monitor detection distance $D_1$ detected by distance sensor 6 and determine in step S404 of FIG. 4 whether or not an abrupt change takes place in detection distance $D_1$. In this case, for example, in step S402, an amount of change determined as the abrupt change is set as D0. Because the abrupt change taking place in detection distance $D_1$ is determined as the distance between the user and walking assistance device 100 being changed due to stumbling of the user or a certain accident, motor 5 is controlled accordingly to result in increased safety.

Further, in the present embodiment, it has been illustrated that motor 5 is controlled to stop walking assistance device 100 when the distance between walking assistance device 100 and the user is out of the safety distance range; however, the present disclosure is not limited to this and control may be performed to change the rotation speed and torque of motor 5, for example. In other words, any method may be employed as long as the driving unit is controlled to decrease the risk of the user. If walking assistance device 100 is stopped due to a small obstacle, a shallow side ditch, or the like, such obstacle or the like can be overcome when the rotation speed and torque of motor 5 are changed. Moreover, when a road state is changed from a paved road to a gravel road or from a flat road to a sloping road, the user can use walking assistance device 100 without stopping it.

Second Embodiment

Next, a second embodiment will be described. In the present embodiment, the following describes a method of setting a safety distance range in accordance with inclination of a road surface on which the walking assistance device travels.

Figure 5:
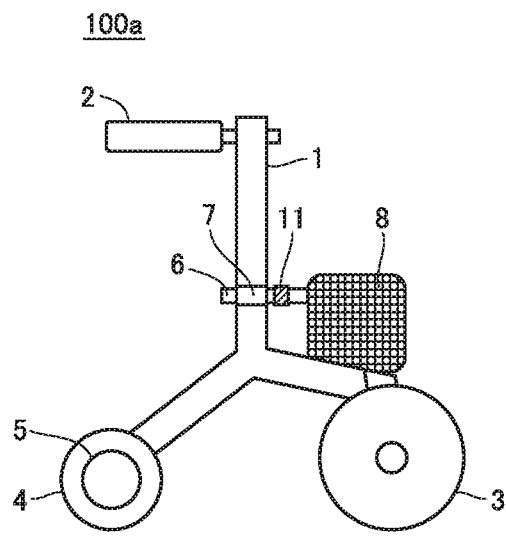
FIG. 5 shows side view and top view each illustrating a structure of a walking assistance device according to a second embodiment.
Figure 5:
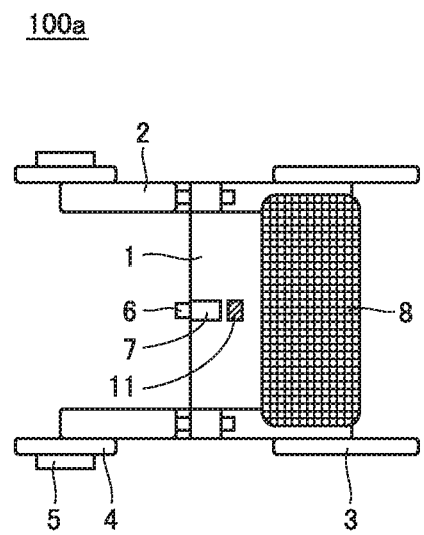

FIG. 5 shows side view and top view each illustrating a structure of a walking assistance device according to the second embodiment. FIG. 5 (a) is a side view showing the structure of walking assistance device 100a according to one embodiment of the present invention, whereas FIG. 5 (b) is a top view thereof. It should be noted that since the basic configuration of this embodiment is the same as that of the first embodiment, the same reference characters are given to components common to those in the foregoing embodiment, and are not repeatedly described and illustrated in the drawings.

Walking assistance device 100a includes: walking assistance device 100 of the first embodiment; and an inclination detection unit 11 that detects inclination of walking assistance device 100. When the user uses walking assistance device 100a on a sloping road or the like, walking assistance device 100a is inclined, so that a degree of inclination of the ground surface can be detected by detecting the inclination of walking assistance device 100. As the inclination detection unit, a gyro sensor, an earth magnetism sensor, an acceleration sensor, or the like is used.

Figure 6:
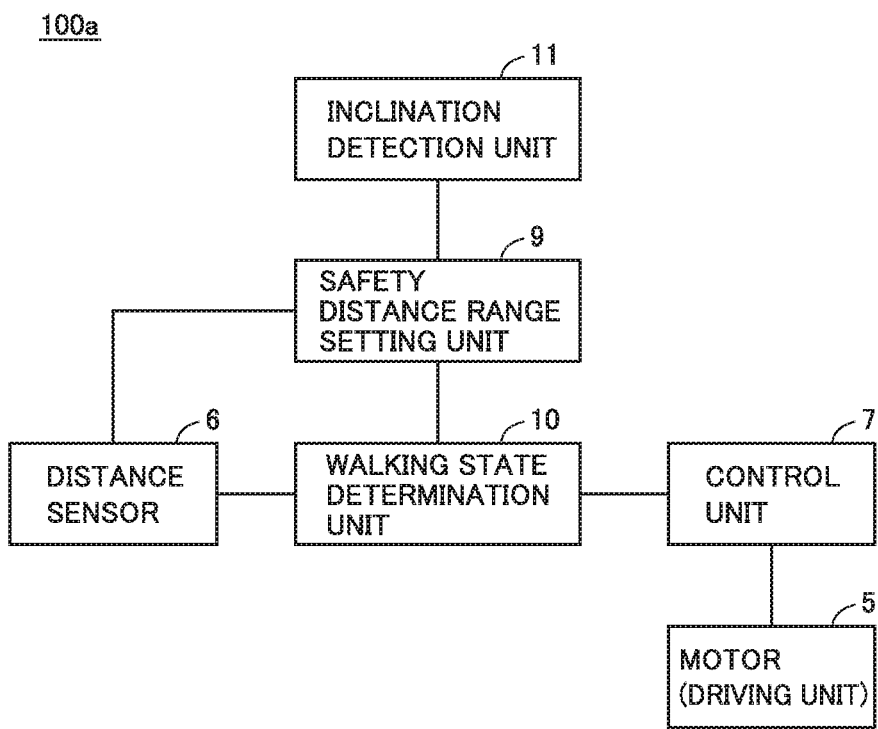
FIG. 6 is a block diagram showing the operation configuration of the walking assistance device according to the second embodiment.

FIG. 6 is a block diagram showing the operation configuration of walking assistance device 100a according to the present embodiment. Inclination detection unit 11 may be provided at any location of walking assistance device 100a as long as the inclination of walking assistance device 100a can be detected. An inclination angle α detected by inclination detection unit 11 is sent to safety distance range setting unit 9. Safety distance range setting unit 9 sets the safety distance range based on inclination angle α.

FIG. 7 shows a table showing an example of setting of the safety distance range according to the second embodiment. As an example of setting of the safety distance range, for example, the following method is employed: as shown in FIG. 7, safety distance range D0 is set based on a table of determining safety distance range D0 (minimum value a, maximum value b) corresponding to inclination angle α detected by inclination detection unit 11. Moreover, as another method, as shown in FIG. 8, safety distance range D0 may be determined based on minimum value m and maximum value n each serving as a reference value as well as a table for setting a factor, by which the reference value is multiplied, in accordance with detected inclination angle α. FIG. 8 shows a table showing an example of setting of the safety distance range according to the second embodiment. Apart from this, a method of adding or subtracting a predetermined value to/from the reference value may be used. Minimum value m and maximum value n serving as reference values here may be determined in the following manner as described in the first embodiment, a time measurement unit or the like is provided at walking assistance device 100a, a distance from walking assistance device 100a to the user is detected by distance sensor 6 when the user safely walks on a flat plane for a predetermined period of time, and minimum value m and maximum value n each serving as the reference value may be determined based on the value thereof.

According to this method, the safety distance range can be set in accordance with the inclination of the road surface on which walking assistance device 100a travels, thereby allowing for safe walking on a sloping road or the like involving more risk than that when safely walking on a flat plane normally.

When the user is actually walking using walking assistance device 100a, walking state determination unit 10 compares detection distance $D_1$ from walking assistance device 100a to the user as detected by distance sensor 6 with safety distance range D0 (minimum value a, maximum value b) set as described above, and determines whether or not detection distance $D_1$ is out of the safety distance range.

Control unit 7 determines the rotation speed or torque of motor 5 connected to rear wheel 4 in accordance with a built-in program, and controls the rotation speed or torque of each of left/right motors 5 in accordance with the determined value. Moreover, the manner of control may be changed between a case where detection distance $D_1$ is larger than safety distance range D0 (minimum value a, maximum value b) or a case where detection distance $D_1$ is smaller than safety distance range D0 (minimum value a, maximum value b).

Figure 9:
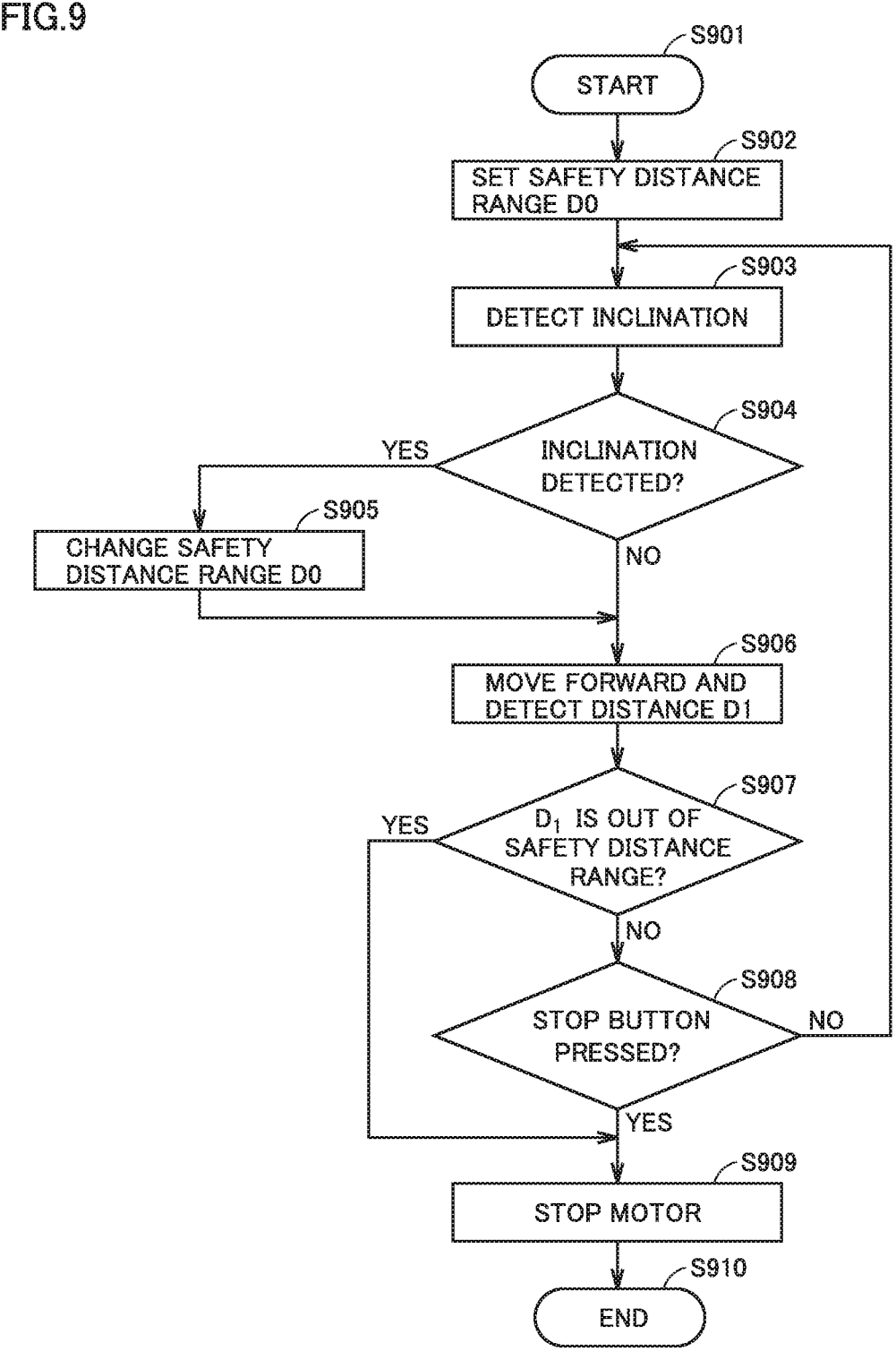
FIG. 9 is a flowchart showing an example of operation of the walking assistance device according to the second embodiment.

FIG. 9 is a flowchart showing an example of operation of walking assistance device 100a in the present embodiment. In this flowchart, the following describes an exemplary case where the user safely walks on a flat plane and then walking assistance device 100a travels on a road surface having inclination.

First, the start button of walking assistance device 100a is turned on to bring walking assistance device 100a into the operation state (step S901). Next, safety distance range setting unit 9 sets safety distance range D0 (minimum value a, maximum value b) (step S902). A method of determining safety distance range D0 as set after starting of walking assistance device 100a may be such that a time measurement unit or the like is provided at walking assistance device 100a, a distance from walking assistance device 100a to the user is detected by distance sensor 6 when the user safely walks for a predetermined period of time after starting walking assistance device 100a, the minimum value and the maximum value are determined based on the value thereof, and then the safety distance range is set as described above. Alternatively, the method may be such that the same value is used once the value is set until it is changed next time.

Next, inclination detection unit 11 detects inclination angle α (step S903). Inclination detection unit 11 determines whether or not the inclination of walking assistance device 100a has been detected (step S904). When the inclination is detected (YES in step S904), the information of inclination angle α is transmitted to safety distance range setting unit 9, and safety distance range D0 is changed based on a table shown in, for example, FIG. 7 (step S905). Specifically, a safety distance range D0' is set to narrow safety distance range D0. With such a narrowed safety distance range D0, the precision of walking state determination unit 10 becomes high, thereby improving safety more. Here, the safety distance range after the change is regarded as safety distance range D0' (minimum value a, maximum value b).

Then, walking assistance device 100a is moved forward and distance sensor 6 detects detection distance $D_1$ from walking assistance device 100a to the user (step S906). Next, walking state determination unit 10 compares safety distance range D0' set as described above with detection distance $D_1$, and determines whether or not detection distance $D_1$ is out of safety distance range D0' (minimum value a, maximum value b) (step S907). When detection distance $D_1$ is out of safety distance range D0' (minimum value a, maximum value b) (YES in step S907), walking state determination unit 10 determines that the user and walking assistance device 100 are too close to each other or are too distant away from each other, and sends a determination signal to control unit 7. In accordance with a built-in program, control unit 7 stops rotation of motor 5 connected to rear wheel 4 (step S909), and ends the operation of walking assistance device 100a (step S910).

On the other hand, when detection distance $D_1$ is within safety distance range D0' (NO in step S907), it is determined that the user is not too close to walking assistance device 100a or too distant away from walking assistance device 100a, and control unit 7 determines whether or not a stop button is pressed (step S908). When the stop button is pressed (YES in step S908), control unit 7 stops rotation of motor 5 connected to rear wheel 4 in accordance with the built-in program (step S909) and ends the operation of walking assistance device 100 (step S910). On the other hand, when the stop button is not pressed (NO in step S908), the detection of inclination angle α by inclination detection unit 11 of walking assistance device 100a is continued (step S903).

Moreover, in step S904, when the inclination is not detected by inclination detection unit 11 (NO in step S904), walking assistance device 100a is moved forward and distance sensor 6 detects detection distance $D_1$ from walking assistance device 100a to the user (step S906). Next, walking state determination unit 10 compares safety distance range D0 set as described above with detection distance $D_1$ and determines whether or not detection distance $D_1$ is out of safety distance range D0 (step S907). When detection distance $D_1$ is out of safety distance range D0 (YES in step S907), walking state determination unit 10 determines that the user and walking assistance device 100 are too close to each other or are too distant away from each other, and sends a determination signal to control unit 7. In accordance with a built-in program, control unit 7 stops rotation of motor 5 connected to rear wheel 4 (step S909), and ends the operation of walking assistance device 100a (step S910).

On the other hand, when detection distance D1 is within safety distance range D0 (NO in step S907), it is determined that the user is not too close to walking assistance device 100a or too distant away from walking assistance device 100a, and control unit 7 determines whether or not a stop button is pressed (step S908). When the stop button is pressed (YES in step S908), control unit 7 stops rotation of motor 5 connected to rear wheel 4 in accordance with the built-in program (step S909) and ends the operation of walking assistance device 100a (step S910). On the other hand, when the stop button is not pressed (NO in step S908), the detection of inclination angle α by inclination detection sensor 11 of walking assistance device 100a is continued (step S903).

By performing the operation as described above, a safety distance between the user and the walking assistance device is appropriately controlled in accordance with the user's walking state and walking environment such as a sloping road, thereby preventing the user from bending knees and falling as a result of losing balance.

Third Embodiment

Next, a third embodiment will be described. In the present embodiment, the following describes a method of controlling driving unit 5 using detection of pressure with which the user grasps grip 2 of the walking assistance device.

Figure 10:
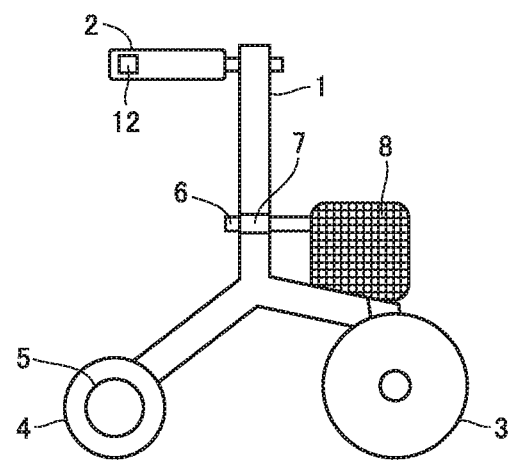
FIG. 10 is a side view showing the structure of a walking assistance device 100b according to a third embodiment.

FIG. 10 is a side view showing a structure of a walking assistance device 100b according to the present embodiment. It should be noted that since the basic configuration of this embodiment is the same as that of each of the first and second embodiments, the same reference characters are given to components common to those in the first embodiment, and are not repeatedly described and illustrated in the drawings. Walking assistance device 100b includes: walking assistance device 100 of the first embodiment; and a pressure detection unit 12. Pressure detection unit 12 is provided, for example, at grip 2 or the like, and detects pressure with which the user grasps the grip of walking assistance device 100b. Examples of pressure detection unit 12 include a pressure-sensitive sensor, a strain gage, and the like.

Figure 11:
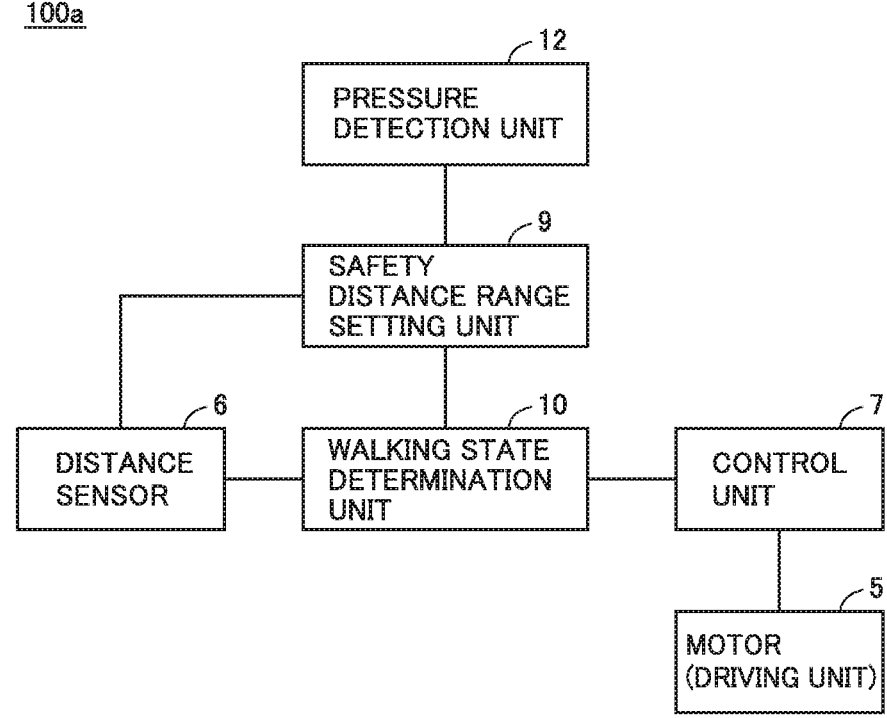
FIG. 11 is a block diagram showing the operation configuration of the walking assistance device according to the third embodiment.

FIG. 11 is a block diagram showing the operation configuration of walking assistance device 100b according to the present embodiment. The pressure value detected by pressure detection unit 12 is sent to safety distance range setting unit 9. Safety distance range setting unit 9 sets the safety distance range based on the pressure value. A process after this is performed in the same manner as in the second embodiment.

During normal walking, the driving is controlled in the same manner as in the first embodiment in the case where approach determination unit 9 detects that the user and walking assistance device 100b come close to each other in terms of distance. Here, the pressure of grip 2 may be changed because the user grasps grip 2 strongly or may loose his/her hold on grip 2 when the user stumbles or the user loses balance in a certain trouble. As such, when there is a large change in pressure detection unit 12 provided at grip 2, a signal is sent from pressure detection unit 12 to safety distance range setting unit 9, and the safety distance range is set based on this. This provides improved precision in detecting that the user lost balance, thereby further increasing safety.

Fourth Embodiment

As an embodiment other than the above-described embodiments, a speed detection unit may be employed in addition to inclination detection unit 11 and pressure detection unit 12. The speed detection unit is provided at each of front wheels 3, rear wheels 4, and the like to detect the speed of the walking assistance device.

When the user stumbles during walking using the walking assistance device or the like, the walking assistance device may be moved forward abruptly. In such a case, the speed detection unit detects the speed of the walking assistance device, and the safety distance range is set based on this, thereby improving precision in detecting that the user lost balance as with the above-mentioned embodiments. Accordingly, safety can be improved more.

Furthermore, as another embodiment, a traveling direction detection unit may be further provided to detect the traveling direction of the walking assistance device. The traveling direction detection unit is provided at each of front wheels 3, rear wheels 4, motors 5, and the like to detect the traveling direction of the walking assistance device. As the traveling direction detection unit, a method of detecting the rotation direction of the motor or an acceleration sensor or the like is used.

Based on the traveling direction detected by the traveling direction detection unit, control unit 7 controls driving unit 5. For example, when detection distance $D_1$ falls out of the safety distance range to result in that the walking assistance device and the user are too close to each other while the walking assistance device is moved forward, control unit 7 controls driving unit 5 to stop or further move forward the walking assistance device. Moreover, when the walking assistance device and the user are too distant away from each other, control unit 7 controls driving unit 5 to stop or move backward the walking assistance device. On the other hand, when detection distance $D_1$ falls out of the safety distance range while the walking assistance device is moved backward to result in that the walking assistance device and the user is too close to each other, control unit 7 controls driving unit 5 to stop or move forward the walking assistance device. Moreover, when the walking assistance device and the user are too distant away from each other, control unit 7 controls driving unit 5 to stop or further move backward the walking assistance device.

With the configuration described above, a walking assistance device excellent in safety can be realized, whereby a safety distance between the user and the walking assistance device is appropriately controlled in accordance with the user's walking state and walking environment, thereby preventing the user from bending knees and falling as a result of losing balance.

Fifth Embodiment

Figure 12:
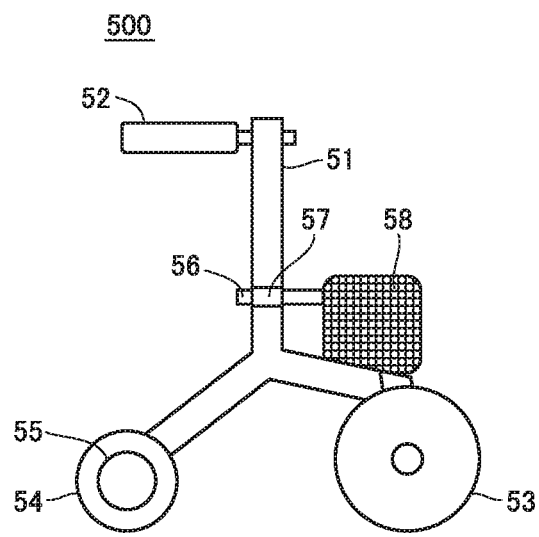
FIG. 12 shows side view and top view each illustrating a structure of a walking assistance device according to a fourth embodiment.
Figure 12:
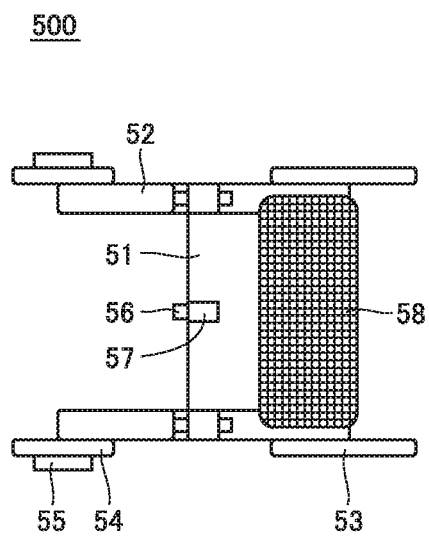

FIG. 12 shows side view and top view each illustrating a structure of a walking assistance device according to a fourth embodiment. FIG. 12 (a) is a side view showing the structure of walking assistance device 500 according to one embodiment of the present invention, whereas FIG. 12 (b) is a top view thereof. Walking assistance device 500 includes: a base body 51; a pair of left/right front wheels 53 and a pair of left/right rear wheels 54 movably supporting on a traveling surface on which base body 51 travels; a grip 52 provided on base body 51 and supported by the user; and a motor 55 serving as a driving unit that drives rear wheels 54. In this configuration, motor 55 is provided at rear wheel 54 and drives rear wheel 54 to control the operation of walking assistance device 500; however, motor 55 may drive front wheel 53 to control the operation of walking assistance device 500, or may be provided at each of front wheel 53 and rear wheel 54. Furthermore, near the center of base body 51, a storage portion 58 is provided to store a luggage or the like.

Moreover, walking assistance device 500 includes a distance sensor 56 that detects a distance from walking assistance device 500 to the user, and control unit 57 controls motor 55 based on the distance measured by distance sensor 56. As distance sensor 56, a non-contact sensor such as an ultrasonic sensor or an infrared sensor can be used. Alternatively, instead of the distance sensor, a proximity sensor may be used.

In the present embodiment, one distance sensor 56 is provided at a lower portion between left/right grips 52; however, in order to further increase the detection precision, a plurality of distance sensors may be provided. For example, distance sensors are provided in the vicinity of left/right grips 52. Moreover, in order to facilitate detecting the user's legs, distance sensor 56 is desirably disposed at a lower side of base body 51.

Figure 13:
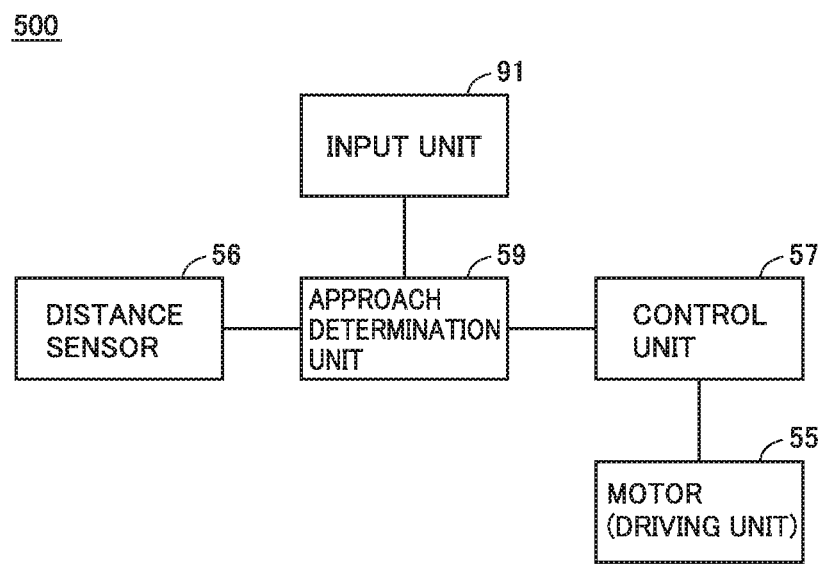
FIG. 13 is a block diagram showing the operation configuration of the walking assistance device according to the fourth embodiment.

FIG. 13 is a block diagram showing the operation configuration of walking assistance device 500. Approach determination unit 59 is provided in the vicinity or inside of distance sensor 56 or control unit 57, and includes an input unit 91. Predetermined distance D0 is input from input unit 91 to approach determination unit 59.

Figure 14A:
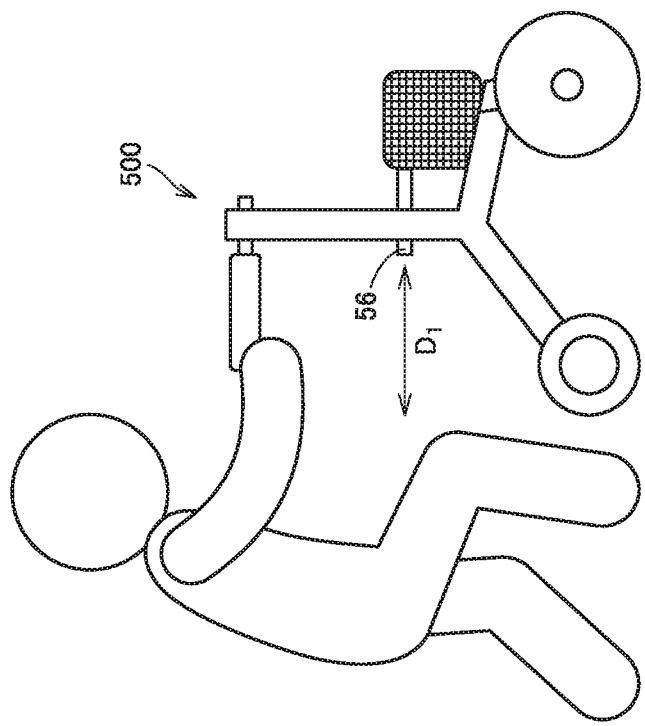
FIG. 14 shows a positional relation between the walking assistance device and the user.
Figure 14B:
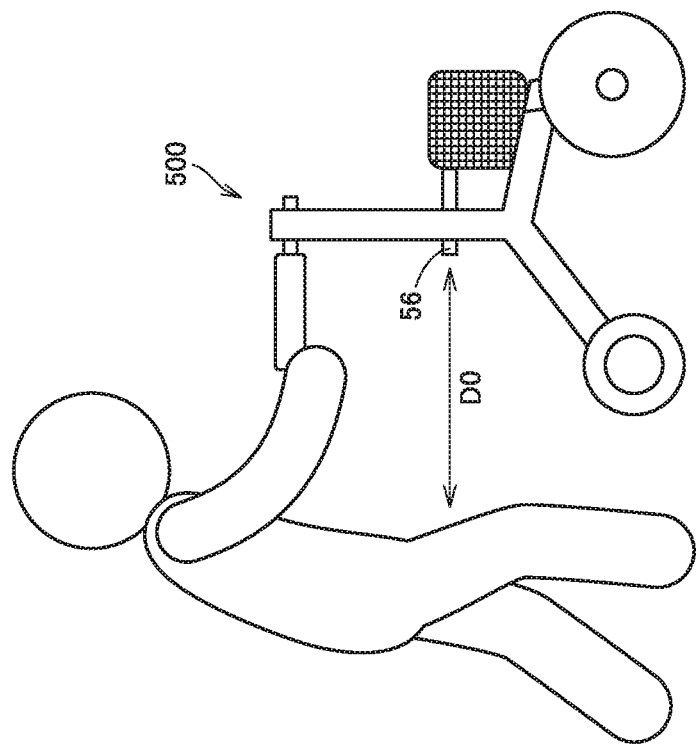

FIG. 14 shows a positional relation between walking assistance device 500 and the user. FIG. 14 (a) shows a state of normal walking, and FIG. 14 (b) shows a state of knee bending as an example of the user coming close to walking assistance device 500. Here, assume that a distance between walking assistance device 500 and the user during normal walking as shown in FIG. 14 (a) is a predetermined distance D0. Predetermined distance D0 is a reference value based on which it is determined that the user and walking assistance device 500 come close to each other. Predetermined distance D0 can be set at any value. Also assume that during actual walking of the user, a distance from walking assistance device 500 to the user as detected by distance sensor 56 is a detection distance D1.

Approach determination unit 59 compares detection distance D1 from walking assistance device 500 to the user as detected by distance sensor 56 with predetermined distance D0 input in advance from input unit 91, determines that the user and walking assistance device 500 come close to each other when D1<D0, and sends a determination signal to control unit 57. When walking assistance device 500 is moving forward, control unit 57 controls the rotation speed or torque of motor 55 in accordance a the built-in program to determine the rotation speed or torque of motor 55 connected to rear wheel 54, and controls the rotation speed or torque of motor 55 in accordance with the determined value, thereby stopping walking assistance device 500 from moving forward. When an interval between the user and walking assistance device 500 becomes narrow by performing such control, the user can be prevented from bending knees and falling as a result of losing balance.

FIG. 15 is a flowchart showing an example of operation of walking assistance device 500 in the present embodiment.

First, the start button of walking assistance device 500 is turned on to bring walking assistance device 500 into an operation state (step S1501). Next, input unit 91 sends predetermined distance D0 to approach determination unit 59 (step S1502). It should be noted that predetermined distance D0 may be set whenever it is used, or the same value may be used once it is set until it is changed next time. Next, the user grabs grip 52 of walking assistance device 500 and moves forward with rear wheel 54 being driven by rotation of motor 55, and detection distance D1 is detected by distance sensor 56 (step S1503).

Next, approach determination unit 59 compares detection distance D1 from walking assistance device 500 to the user as detected by distance sensor 56 with predetermined distance D0 input in advance, and determines whether or not D1<D0 is satisfied (step S1504). When D1<D0 is satisfied (YES in step S1504), approach determination unit 59 determines that the user and walking assistance device 500 come close to each other, and sends a determination signal to control unit 57. In accordance with a built-in program, control unit 57 stops rotation of motor 55 connected to rear wheel 54 (step S1506), and ends the operation of walking assistance device 500 (step S1507).

On the other hand, when D1<D0 is not satisfied (NO in step S1504), it is determined that the user does not come close to walking assistance device 500 and it is determined by control unit 57 whether or not a stop button is pressed (step S1505). When the stop button is pressed (YES in step S1505), control unit 57 stops rotation of motor 55 connected to rear wheel 54 in accordance with the built-in program (step S1506) and ends the operation of walking assistance device 500 (step S1507). On the other hand, when the stop button is not pressed (NO in step S1505), walking assistance device 500 is continuously moved forward and the detection by distance sensor 56 is continued.

With the above configuration, when the interval between the user and walking assistance device 500 becomes narrow, the user can be prevented from bending knees and falling as a result of losing balance.

It should be noted that in the present embodiment, it has been illustrated that motor 55 is controlled to stop walking assistance device 500 when walking assistance device 500 and the user come close to each other in terms of distance; however, the present disclosure is not limited to this and control may be performed to change and increase the rotation speed and torque of motor 55, for example. In other words, any method may be employed as long as the driving unit is controlled to decrease the risk of the user. If walking assistance device 500 is stopped due to a small obstacle, a shallow side ditch, or the like, such obstacle or the like can be overcome when changing and the rotation speed and torque of motor 55 to move further forward. Moreover, when a road state is changed from a paved road to a gravel road or from a flat road to a sloping road, the user can use walking assistance device 500 without stopping it.

Sixth Embodiment

Next, a sixth embodiment will be described. In the present embodiment, the following describes a method of controlling the driving unit in accordance with a traveling direction of the walking assistance device.

Figure 16:
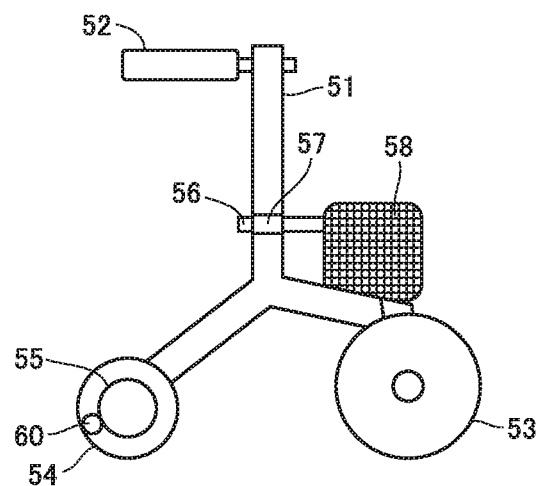
FIG. 16 is a side view showing a structure of a walking assistance device according to a fifth embodiment.

FIG. 16 is a side view showing a structure of walking assistance device 500a according to the present embodiment. It should be noted that since the basic configuration of this embodiment is the same as that of the fifth embodiment, the same reference characters are given to components common to those in the fifth embodiment, and are not repeatedly described and illustrated in the drawings.

Walking assistance device 500a includes: walking assistance device 500 of the fifth embodiment; and a traveling direction detection unit 60. Traveling direction detection unit 60 is provided at any one of front wheels 53, rear wheels 54, motors 55, and the like to detect the traveling direction of walking assistance device 500a. As traveling direction detection unit 60, a method of detecting the rotation direction of the motor or an acceleration sensor or the like are used.

Figure 17:
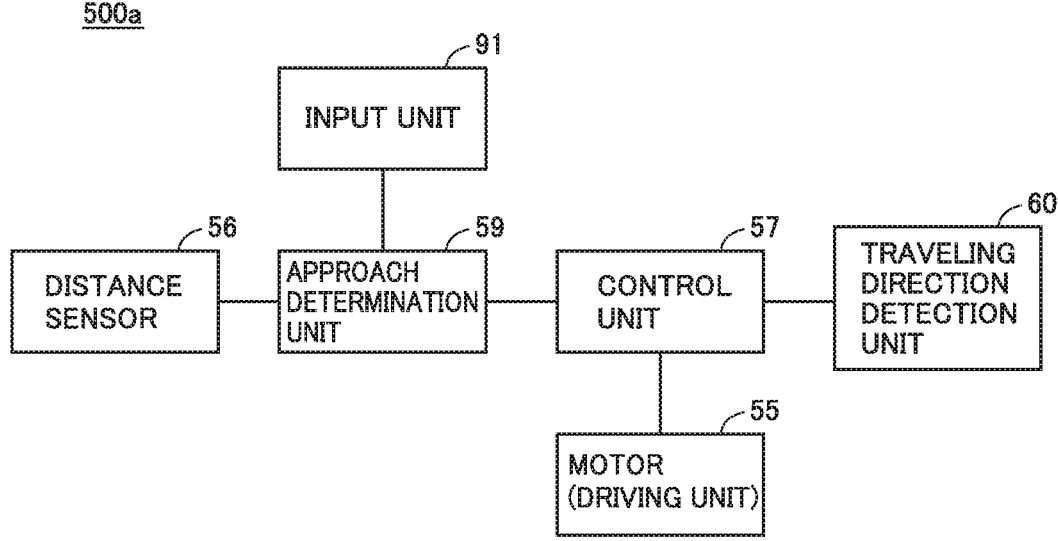
FIG. 17 is a block diagram showing the operation configuration of the walking assistance device according to the fifth embodiment.

FIG. 17 is a block diagram showing the operation configuration of walking assistance device 500a according to the present embodiment. Approach determination unit 59 is provided in the vicinity or inside of distance sensor 56 or control unit 57, and includes input unit 91. Distance D0 is input to approach determination unit 59 from input unit 91.

When approach determination unit 59 detects that the user and walking assistance device 500a come close to each other in terms of distance, traveling direction detection unit 60 detects the traveling direction of walking assistance device 500a. Control unit 57 controls driving unit 55 in accordance with the traveling direction detected by traveling direction detection unit 60.

For example, when walking assistance device 500a and the user come close to each other while walking assistance device 500a is moving forward, as with the fifth embodiment, it is determined that the knees are bent and driving unit 55 is controlled to stop walking assistance device 500a. On the other hand, when walking assistance device 500a and the user come close to each other while walking assistance device 500a is moving backward, it is determined that the user is about to fall back and driving unit 55 is controlled to suppress or stop walking assistance device 500a from being moved backward or to move walking assistance device 500a forward.

Moreover, when the user bends the knees and when the user is about to fall back, the distance between the user and walking assistance device 500a differs, so that the distance with which it is determined that the user and walking assistance device 500a come close to each other may be changed between a case of moving forward and a case of moving backward. In this case, two thresholds are prepared for a value sent from input unit 91 to approach determination unit 59 and the control may be performed based on the traveling direction detected by traveling direction detection unit 60.

Figure 18:
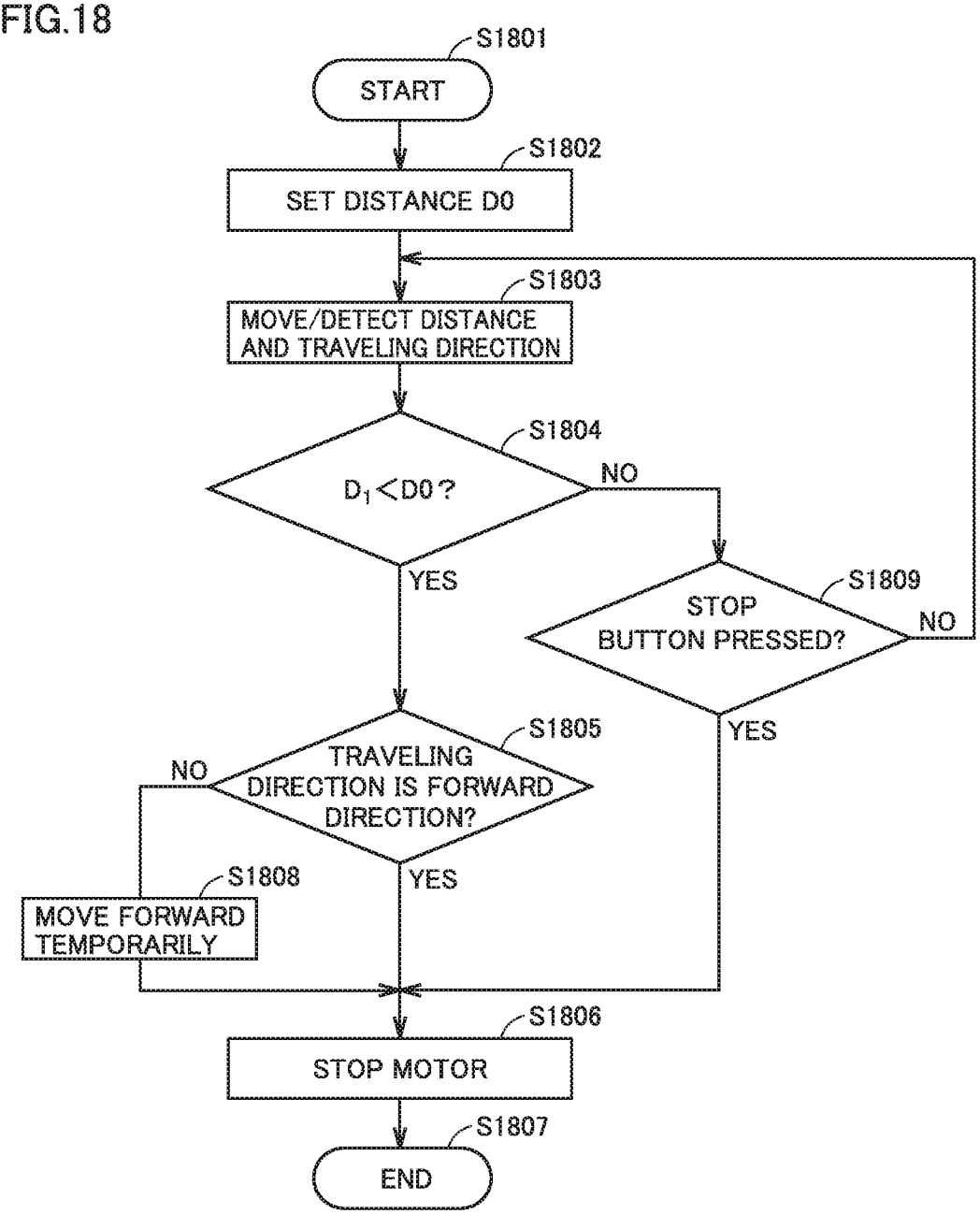
FIG. 18 is a flowchart showing an example of operation of the walking assistance device according to the fifth embodiment.

FIG. 18 is a flowchart showing an example of operation of walking assistance device 500a in the present embodiment. This flowchart illustrates a case where when walking assistance device 500a and the user come close to each other while walking assistance device 500a is moving backward, walking assistance device 500a is moved forward temporarily and then walking assistance device 500a is stopped for safety.

First, the start button of walking assistance device 500a is turned on to bring walking assistance device 500a into the operation state (step S1801). Next, distance D0 is input to approach determination unit 59 from input unit 91 (step S1802). Next, the user grabs grip 52 of walking assistance device 500a, which is then moved by driving rear wheel 54 by rotation of motor 55, and the detection of detection distance D1 by distance sensor 56 and the detection of the traveling direction by traveling direction detection unit 60 are performed (step S1803).

Next, approach determination unit 59 compares detection distance D1 from walking assistance device 500 to the user as detected by distance sensor 56 with predetermined distance D0 input in advance, and determines whether or not D1<D0 is satisfied (step S1804). When D1<D0 is satisfied (YES in step S1804), approach determination unit 59 determines that the user and walking assistance device 500a come close to each other, and sends a determination signal to control unit 57. Control unit 57 detects whether or not the traveling direction detected by traveling direction detection unit 60 is the forward direction (step S1805), and when the direction is the forward direction (YES in step S1805), control unit 57 stops rotation of motor 5 connected to rear wheel 54 (step S1806), thus ending the operation of walking assistance device 500a (step S1807).

Moreover, when the traveling direction detected by traveling direction detection unit 60 is the backward direction (NO in step S1805), walking assistance device 500a is moved forward temporarily to provide a wide distance between walking assistance device 500a and the user, thereby preventing the user from falling (step S1808). Then, the rotation of motor 5 connected to rear wheel 54 is stopped (step S1806), thus ending the operation of walking assistance device 500a (step S1807).

On the other hand, when D1<D0 is satisfied (NO in step S1804), it is determined that the user does not come close to walking assistance device 500a and it is determined by control unit 57 whether or not the stop button is pressed (step S1809). When the stop button is pressed (YES in step S1809), control unit 57 stops rotation of motor 55 connected to rear wheel 54 in accordance with the built-in program (step S1806) and ends the operation of walking assistance device 500 (step S1807). On the other hand, when the stop button is not pressed (NO in step S1809), walking assistance device 500a is continuously moved and the detection by each of distance sensor 56 and traveling distance detection unit 60 is continued.

With the configuration, when the interval between the user and walking assistance device 500a becomes narrow, appropriate driving control is performed in accordance with the traveling direction of walking assistance device 500a, thereby improving safety more and preventing the user from bending knees and falling as a result of losing balance.

Seventh Embodiment

Next, a seventh embodiment will be described. In the present embodiment, the following describes a method of controlling the driving unit using detection of pressure with which the user grasps the grip of the walking assistance device.

Figure 19:
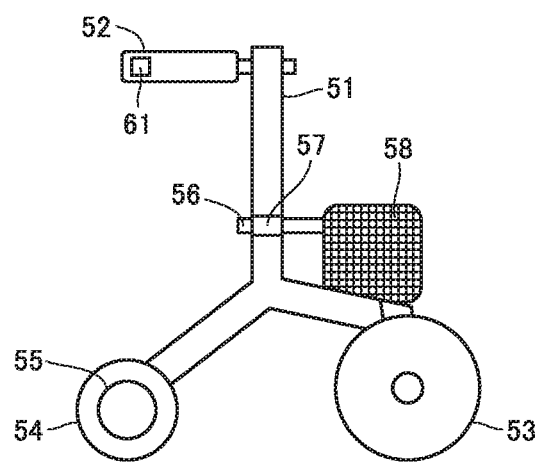
FIG. 19 is a side view showing the structure of the walking assistance device according to the sixth embodiment.

FIG. 19 is a side view showing the structure of walking assistance device 500b according to the present embodiment. It should be noted that since the basic configuration of this embodiment is the same as that of the fifth embodiment, the same reference characters are given to components common to those in the fifth embodiment, and are not repeatedly described and illustrated in the drawings.

Walking assistance device 500b includes: walking assistance device 500 of the fifth embodiment; and a pressure detection unit 61. Pressure detection unit 61 is provided, for example, at grip 52 or the like, and detects pressure with which the user grasps the grip of walking assistance device 500b. Examples of the pressure detection unit 61 include a pressure-sensitive sensor, a strain gage, and the like.

Figure 20:
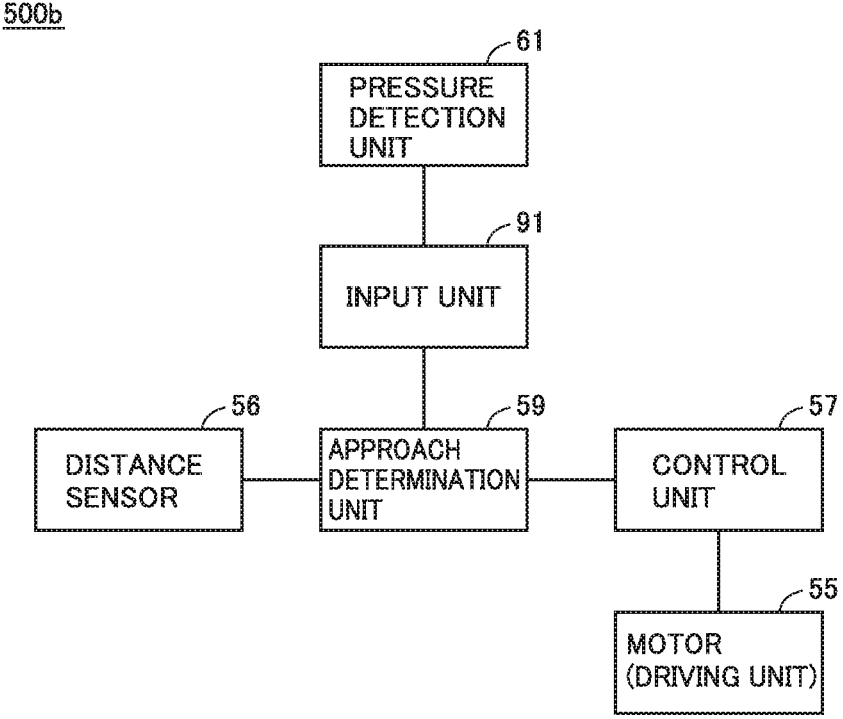
FIG. 20 is a block diagram showing the operation configuration of the walking assistance device according to the sixth embodiment.

FIG. 20 is a block diagram showing the operation configuration of walking assistance device 500b according to the present embodiment. Approach determination unit 59 is provided in the vicinity or inside of distance sensor 56 or control unit 57, and includes input unit 91. Predetermined distance D0 is temporarily input to approach determination unit 59 from input unit 91.

During normal walking, when approach determination unit 59 detects that the user and walking assistance device 500b come close to each other in terms of distance, the same drive control as that in the fifth embodiment is performed. Here, when the user stumbles or when the user loses balance due to a certain trouble, the user may grasp grip 52 strongly or loose his/her hold on grip 52, with the result that the pressure of the grip may be changed. Thus, when there is a great change at pressure detection unit 61 provided in grip 52, a signal is sent from pressure detection unit 61 to the input unit to increase the value of predetermined distance D0 input to approach determination unit 59. In this way, a distance with which it is determined that walking assistance device 500b and the user come close to each other becomes large, thereby improving precision in detecting that the user lost balance. Accordingly, safety can be improved more.

Figure 21:
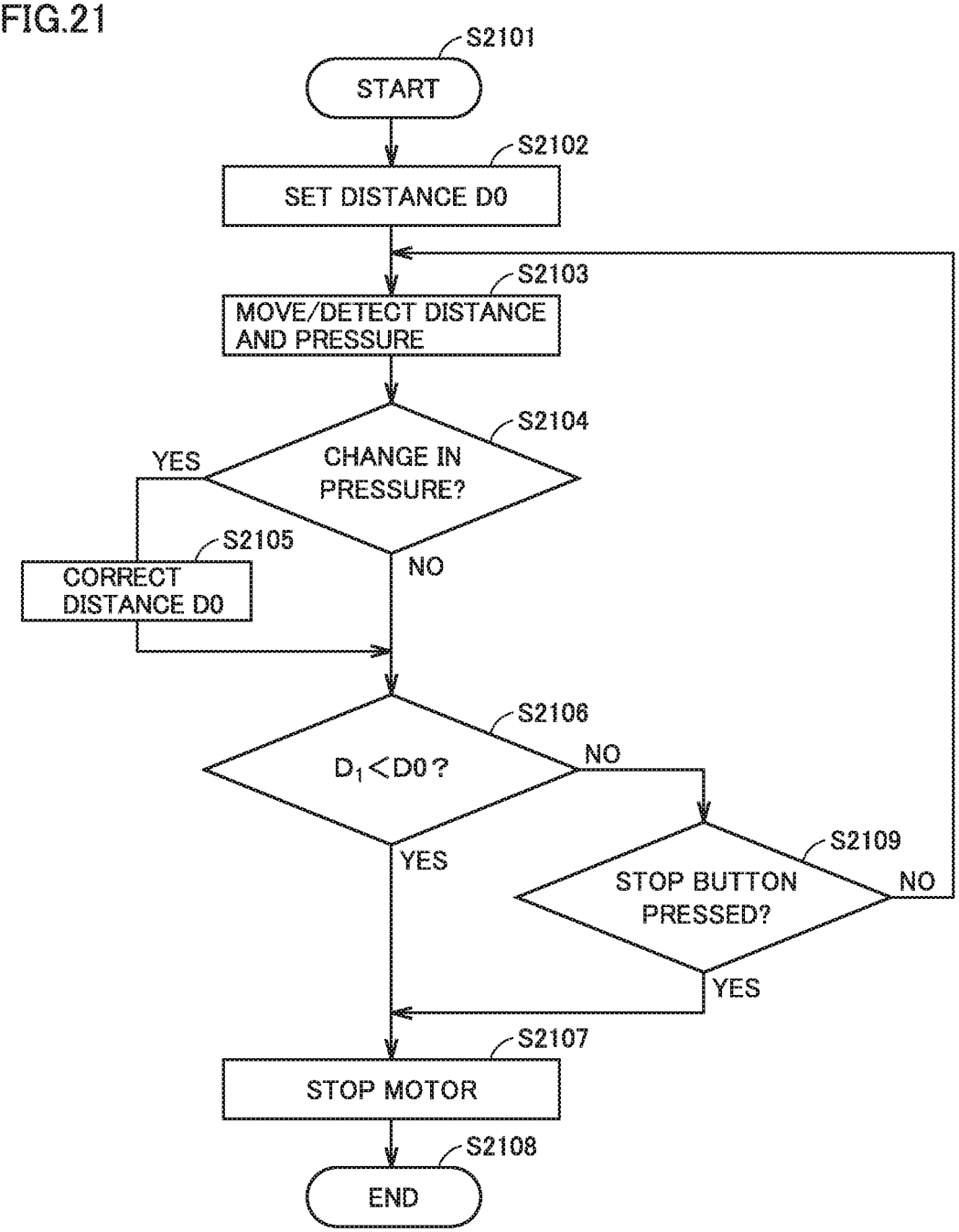
FIG. 21 is a flowchart showing an example of operation of the walking assistance device according to the sixth embodiment.
Figure 22:
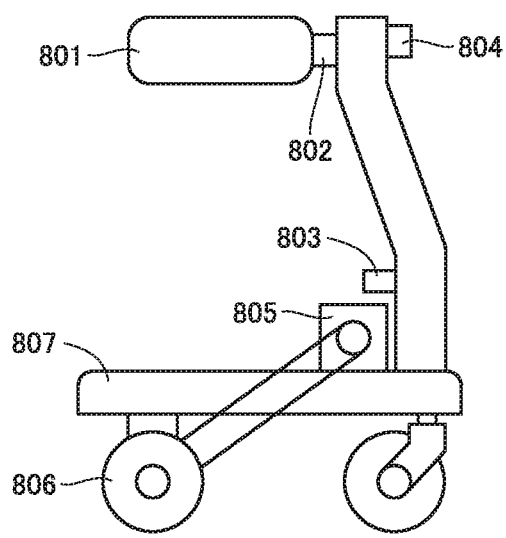
FIG. 22 is a side view showing a structure of a conventional walking assistance device.

FIG. 21 is a flowchart showing an example of operation of walking assistance device 500b in the present embodiment. Based on this figure, the following describes the operation of walking assistance device 500b.

First, the start button of walking assistance device 500b is turned on to bring walking assistance device 500b into the operation state (step S2101). Next, predetermined distance D0 is input to approach determination unit 59 from input unit 91 (step S2102). Next, the user grabs grip 52 of walking assistance device 500b, which is then moved by driving rear wheel 54 by rotation of motor 55, and the detection of detection distance D1 by distance sensor 56 and the detection of the traveling direction by pressure detection unit 61 are performed (step S2103).

Next, pressure detection unit 61 detects whether or not there occurs a change in pressure with which the user grasps the grip (step S2104). When there occurs a change in pressure (YES in step S2104), the value of predetermined distance D0 of approach determination unit 59 is corrected (step S2105). Normally, when there occurs a change in pressure, predetermined distance D0 is corrected to a value larger than an initial setting value. It should be noted that the change of D0 due to change in pressure is temporary, and is returned to original distance D0 when a certain period of time passes after it is brought into a stationary state. On the other hand, when there is no change in pressure (NO in step S2104), approach determination unit 59 compares detection distance D1 from walking assistance device 500 to the user as detected by distance sensor 56 with predetermined distance D0, and determines whether or not D1<D0 is satisfied (step S2106). When D1<D0 is satisfied (YES in step S2106), approach determination unit 59 determines that the user and walking assistance device 500b come close to each other, and sends the determination signal to control unit 57. Control unit 57 stops rotation of motor 55 connected to rear wheel 54 (step S2107), and ends the operation of walking assistance device 500b (step S2108).

On the other hand, when D1<D0 is not satisfied (NO in S2106), it is determined that the user does not come close to walking assistance device 500a, and control unit 57 determines whether or not the stop button is pressed (step S2109). When the stop button is pressed (YES in step S2109), control unit 57 stops rotation of motor 55 connected to rear wheel 54 in accordance with the built-in program (step S2107) and ends the operation of walking assistance device 500b (step S2108). On the other hand, when the stop button is not pressed (NO in step S2109), the movement of walking assistance device 500b and the detection by each of distance sensor 56 and pressure detection unit 61 are continued.

With the above configuration, information of stumbling of the user or information of risk increased when the user loses balance due to a certain trouble can be obtained by the change in pressure of the user's grip. In accordance with this, the distance with which it is determined that the walking assistance device and the user come close to each other is increased, thereby increasing precision in detecting that the user lost balance. This makes it possible to prevent the user from bending knees and falling as a result of losing balance, thereby further improving safety of the walking assistance device.

As described above in each of the embodiments, according to the present invention, a walking assistance device excellent in safety can be realized to prevent a user from bending knees and falling as a result of losing balance when the interval between the user and the walking assistance device becomes narrow.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

The present invention can be suitably applied to a walking assistance device used for training of walking, walking, or the like of an elderly person, physically challenged person, or small child having a difficulty in walking.

REFERENCE SIGNS LIST

1: base body; 2: grip; 3: front wheel; 4: rear wheel; 5: motor; 6: distance sensor; 7: control unit; 8: storage portion; 9: safety distance range setting unit; 10: walking state determination unit; 11: inclination detection unit; 12: pressure detection unit; 51: base body; 52: grip; 53: front wheel; 54: rear wheel; 55: motor; 56: distance sensor; 57: control unit; 59: approach determination unit; 60: traveling direction detection unit; 61: pressure detection unit; 91: input unit; 500, 500a, 500b: walking assistance device.

The invention claimed is:

1. A walking assistance device comprising:
a base body;
a driving unit configured to move the base body;
a distance detection unit configured to detect a distance from the base body to a user;
a control unit configured to control the driving unit based on a result of determination that at least the user is too close to the walking assistance device, the determination being made by comparing the distance detected by the distance detection unit with a predetermined value for determination;
a safety distance range setting unit configured to set, as a safety distance range, a distance range from the base body to the user during safe walk of the user;
a walking state determination unit configured to determine whether or not the distance detected by the distance detection unit is out of the safety distance range; and
an inclination detection unit configured to detect inclination of a road surface on which the walking assistance device travels, wherein
controlling the driving unit by the control unit based on the result of determination that at least the user is too close to the walking assistance device includes controlling the driving unit by the walking state determination unit when the distance detected by the distance detection unit is determined to be out of the safety distance range; and
the safety distance range setting unit is configured to set the safety distance range based on the inclination detected by the inclination detection unit.

2. The walking assistance device according to claim 1, wherein the safety distance range setting unit is configured to set the safety distance range based on the distance from the base body to the user when the user safely walks for a predetermined period of time.

3. The walking assistance device according to claim 1, wherein the safety distance range setting unit is configured to set the safety distance range to be narrow when the distance detected by the distance detection unit is changed abruptly.

4. The walking assistance device according to claim 1, further comprising a traveling direction detection unit configured to detect a traveling direction of the walking assistance device, wherein
the control unit is configured to control the driving unit based on the traveling direction detected by the traveling direction detection unit.

5. A walking assistance device, comprising:
a base body;
a driving unit configured to move the base body;
a distance detection unit configured to detect a distance from the base body to a user;
a control unit configured to control the driving unit based on a result of determination that at least the user is too close to the walking assistance device, the determination being made by comparing the distance detected by the distance detection unit with a predetermined value for determination;
a safety distance range setting unit configured to set, as a safety distance range, a distance range from the base body to the user during safe walking of the user;
a walking state determination unit configured to determine whether or not the distance detected by the distance detection unit is out of the safety distance range; and
a speed detection unit configured to detect speed of the walking assistance device, wherein
controlling the driving unit by the control unit based on the result of determination that at least the user is too close to the walking assistance device includes controlling the driving unit by the walking state determination unit when the distance detected by the distance detection unit is determined to be out of the safety distance range; and
the safety distance range setting unit is configured to set the safety distance range based on the speed detected by the speed detection unit.

6. The walking assistance device according to claim 5, wherein the safety distance range setting unit is configured to set the safety distance range based on the distance from the base body to the user when the user safely walks for a predetermined period of time.

7. The walking assistance device according to claim 5, wherein the safety distance range setting unit is configured to set the safety distance range to be narrow when the distance detected by the distance detection unit is changed abruptly.

8. The walking assistance device according to claim 5, further comprising a traveling direction detection unit configured to detect a traveling direction of the walking assistance device, wherein
the control unit is configured to control the driving unit based on the traveling direction detected by the traveling direction detection unit.

9. A walking assistance device, comprising:
a base body;
a driving unit configured to move the base body;
a distance detection unit configured to detect a distance from the base body to a user;
a control unit configured to control the driving unit based on a result of determination that at least the user is too close to the walking assistance device, the determination being made by comparing the distance detected by the distance detection unit with a predetermined value for determination;
a safety distance range setting unit configured to set, as a safety distance range, a distance range from the base body to the user during safe walk of the user;
a walking state determination unit configured to determine whether or not the distance detected by the distance detection unit is out of the safety distance range; and
a pressure detection unit configured to detect pressure with which the user grasps the grip, wherein
controlling the driving unit by the control unit based on the result of determination that at least the user is too close to the walking assistance device includes controlling the driving unit by the walking state determination unit when the distance detected by the distance detection unit is determined to be out of the safety distance range; and
the safety distance range setting unit is configured to set the safety distance range based on the pressure detected by the pressure detection unit.

10. The walking assistance device according to claim 9, wherein the safety distance range setting unit is configured to set the safety distance range based on the distance from the base body to the user when the user safely walks for a predetermined period of time.

11. The walking assistance device according to claim 9, wherein the safety distance range setting unit is configured to set the safety distance range to be narrow when the distance detected by the distance detection unit is changed abruptly.

12. The walking assistance device according to claim 9, further comprising a traveling direction detection unit configured to detect a traveling direction of the walking assistance device, wherein
the control unit is configured to control the driving unit based on the traveling direction detected by the traveling direction detection unit.

13. A walking assistance device, comprising:
a base body;
a driving unit configured to move the base body;
a distance detection unit configured to detect a distance from the base body to a user;
a control unit configured to control the driving unit based on a result of determination that at least the user is too close to the walking assistance device, the determination being made by comparing the distance detected by the distance detection unit with a predetermined value for determination;
an approach determination unit configured to detect that the distance detected by the distance detection unit is narrower than a predetermined distance; and
a pressure detection unit configured to detect pressure with which the user grasps a grip, wherein
controlling the driving unit by the control unit based on the result of determination that at least the user is too close to the walking assistance device includes controlling the driving unit by the approach determination unit when the approach determination unit detects that the distance detected by the distance detection unit is narrower than the predetermined distance; and the control unit is configured to set the predetermined distance to be large when the pressure detected by the pressure detection unit is changed.

14. The walking assistance device according to claim 13, further comprising a traveling direction detection unit configured to detect a traveling direction of the walking assistance device, wherein the control unit is configured to control the driving unit to stop the walking assistance device from moving forward or move the walking assistance device more forward when the traveling direction detection unit determines that the traveling direction is a forward direction.

15. The walking assistance device according to claim 14, wherein the control unit is configured to control the driving unit to suppress the walking assistance device from moving backward, stop the walking assistance device, or move forward the walking assistance device, when the traveling direction detection unit determines that the traveling direction is a backward direction.

* * * * *